(12) United States Patent
Huang (10) Patent No.: US 10,970,151 B2
(45) Date of Patent: Apr. 6, 2021

(54) METHOD FOR CONTROLLING CORRECTABLE ERROR REPORTING FUNCTION FOR SERVER DEVICE

(71) Applicant: MITAC COMPUTING TECHNOLOGY CORPORATION, Taoyuan (TW)

(72) Inventor: Chia-Jen Huang, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 148 days.

(21) Appl. No.: 16/375,477

(22) Filed: Apr. 4, 2019

(65) Prior Publication Data

US 2019/0310908 A1    Oct. 10, 2019

(30) Foreign Application Priority Data

Apr. 10, 2018    (TW) ................... 107112339

(51) Int. Cl.
*G06F 11/07*    (2006.01)
*G06F 11/22*    (2006.01)

(52) U.S. Cl.
CPC ...... *G06F 11/0772* (2013.01); *G06F 11/0709* (2013.01); *G06F 11/0751* (2013.01); *G06F 11/2284* (2013.01)

(58) Field of Classification Search
CPC ............ G06F 11/0751; G06F 11/0754; G06F 11/0757; G06F 11/0703; G06F 11/073; G06F 11/0766; G06F 11/0772; G06F 11/0745; G06F 11/2284

See application file for complete search history.

(56) References Cited

U.S. PATENT DOCUMENTS

| 8,230,286 B1 * | 7/2012 | Foley .................. G06F 11/076 714/736 |
| 9,594,570 B2 | 3/2017 | Kumar et al. |
| 2008/0141077 A1 * | 6/2008 | Swanson .............. G06F 11/008 714/48 |

(Continued)

FOREIGN PATENT DOCUMENTS

| CN | 107077408 A | 8/2017 |
| TW | I553650 B | 10/2016 |
| TW | I588649 B | 6/2017 |

*Primary Examiner* — Matthew M Kim
*Assistant Examiner* — Kurosu Risa Altaf
(74) *Attorney, Agent, or Firm* — Rabin & Berdo, P.C.

(57) ABSTRACT

A method for controlling a correctable error reporting function and applicable to a server device is provided, including: receiving, by control unit, a plurality of first error messages sent by a first hardware component in which a plurality of correctable errors occurs in a plurality of hardware components; determining, by the control unit, according to the first error messages, error types of the errors occurring in the first hardware component; determining, by the control unit, whether the number of occurrences of the errors of the error types that occur in the first hardware component within first preset duration reaches a preset number of times; and if the determining result is yes, controlling, by the control unit, the first hardware component to stop performing an error reporting function corresponding to the first error type.

18 Claims, 4 Drawing Sheets

(56) References Cited

U.S. PATENT DOCUMENTS

2015/0178142 A1\* 6/2015 Raj ................... G06F 11/0787
                                              714/49
2017/0242758 A1\* 8/2017 Chou ................. G06F 11/2289
2018/0157525 A1\* 6/2018 Song ................. G06F 11/0772

\* cited by examiner

METHOD FOR CONTROLLING CORRECTABLE ERROR REPORTING FUNCTION FOR SERVER DEVICE

CROSS-REFERENCE TO RELATED APPLICATION

This non-provisional application claims priority under 35 U.S.C. § 119(a) to Patent Application No. 107112339 filed in Taiwan, R.O.C. on Apr. 10, 2018, the entire contents of which are hereby incorporated by reference.

BACKGROUND

Technical Field

The present invention relates to a method for controlling a correctable error reporting function for a server device.

Related Art

In a conventional server, errors may occur from time to time in a hardware component of the server during operation. Using a Peripheral Component Interconnect Express (PCIe) interface as an example, there are two types of errors that may occur in the PCIe interface:

correctable errors and uncorrectable errors. An uncorrectable error may cause the PCIe interface incapable of normal running, while the correctable error does not cause the PCIe interface incapable of normal running but still affects the effectiveness of the PCIe interface. When a correctable error occurs, the hardware of the server may perform a debug operation on the correctable error for self-correction, and the software will not be triggered for an interrupt procedure of central processing unit (CPU) in order to correct the correctable error. Moreover, a BIOS setup menu of the server includes a setting option of whether to record the correctable error. An administrator of the server may enable the foregoing setting option, so that the server records the correctable error and the hardware further performs a debug operation on such type of correctable error according to the record.

However, when a large number of correctable errors occur, though the correctable error may be corrected by the hardware of the server, the hardware components of the server, such as CPU, bear a heavy processing load. When the hardware performs debug operations for the large number of correctable errors, it causes low effectiveness of the server, and sometimes even causes the server to break down. Moreover, if the administrator of the service further enables the foregoing setting option when a large number of correctable errors occur, the server further needs to record messages of the large number of errors that occur. This further increases the processing load on the server and greatly increases a risk of server breakdown.

SUMMARY

In view of this, the present invention provides a method for controlling a correctable error reporting function for a server device.

In an embodiment, a method for controlling a correctable error reporting function and applicable to a server device includes: receiving, by a control unit, a plurality of first error messages sent by a first hardware component in which a plurality of correctable errors occurs in a plurality of hardware components; determining, by the control unit, according to the first error messages, error types of the errors occurring in the first hardware component; determining, by the control unit, whether the number of occurrences of the errors of the error types that occur in the first hardware component within first preset duration reaches a preset number of times; and when the control unit determines that the number of occurrences of the errors of a first error type that occur in the first hardware component within the first preset duration reaches the preset number of times, controlling, by the control unit, the first hardware component to stop performing an error reporting function corresponding to the first error type after the first hardware component sends the first error messages.

In conclusion, according to an embodiment of the method for controlling a correctable error reporting function for a server device in the present invention, a control unit can choose to disable an error reporting function of a corresponding hardware component according to a type of a correctable error occurring in the hardware component. The control unit does not need to disable all error reporting functions in order to prevent server breakdown caused by heavy processing load. Instead, the correctable error reporting function is partially disabled according to a type of a correctable error. In this way, a particular hardware component can be prevented from sending a large quantity of error messages of a particular error type, the effectiveness of a server device can be maintained, and an error reporting function corresponding to an error type can be retained, where the number of occurrence of errors of the error type does not reach a preset number of times, thereby maintaining system stability.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
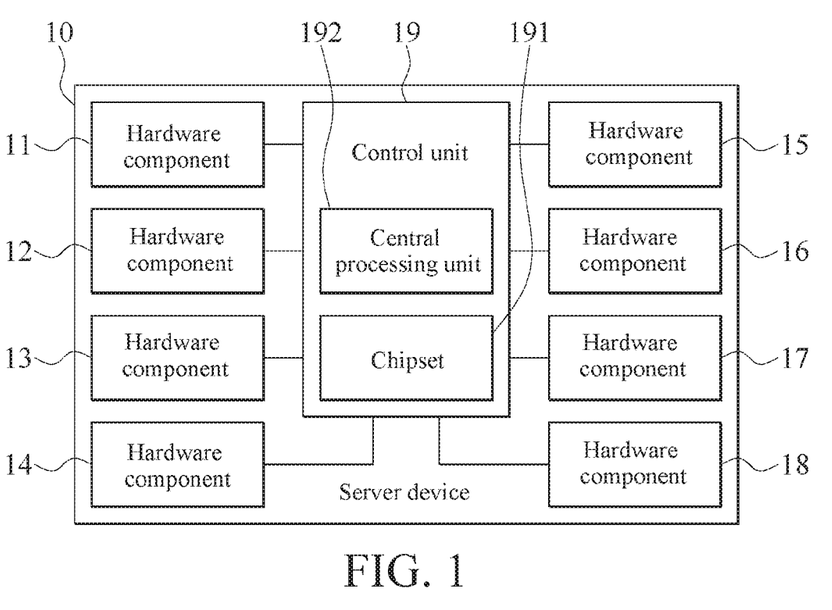
FIG. 1 is a schematic block diagram of an embodiment of a server device according to the present invention.

FIG. 1 is a schematic block diagram of an embodiment of a server device according to the present invention. The server device 10 shown in FIG. 1 includes a plurality of hardware components 11 to 18 and a control unit 19, each of the hardware components 11 to 18 is coupled to the control unit 19. Herein, for example, the server device 10 includes eight hardware components 11 to 18 in FIG. 1, but the present invention is not limited thereto. The number of hardware components included in the server device 10 may be less than eight or more than eight. Each of the hardware components 11 to 18 has an error reporting function corresponding to a plurality of predefined and preset error types. When correctable errors occur in the hardware components 11 to 18, the hardware components 11 to 18 perform the error reporting function corresponding to the correctable errors, to send, according to the plurality of predefined and preset error types, error messages respectively corresponding to different preset error types. For example, there may be 16 predefined and preset error types, including a first error type, a second error type, . . . , and a sixteenth error type. When an error of the first error type occurs in the hardware component 11, the hardware component 11 can send an error message corresponding to the first error type. When an error of the second error type occurs in the hardware component 11, the hardware component 11 can send an error message corresponding to the second error type. The rest can be deduced by analogy for the other error types and the other hardware components 12 to 18. Details are not described herein again.

The control unit 19 is coupled to the hardware components 11 to 18. The control unit 19 is configured to: receive and record error messages from the hardware components 11 to 18, and perform corresponding debug operations according to the hardware components that send the error messages and error types. In addition, when the control unit 19 receives the error messages from the hardware components 11 to 18, the control unit 19 enables a mechanism for detecting the number of errors, to prevent the hardware components 11 to 18 from sending excessive error message, causing extremely heavy processing load to the control unit 19, causing low efficiency of the server device 10, and even causing the server device 10 to break down.

Figure 2:
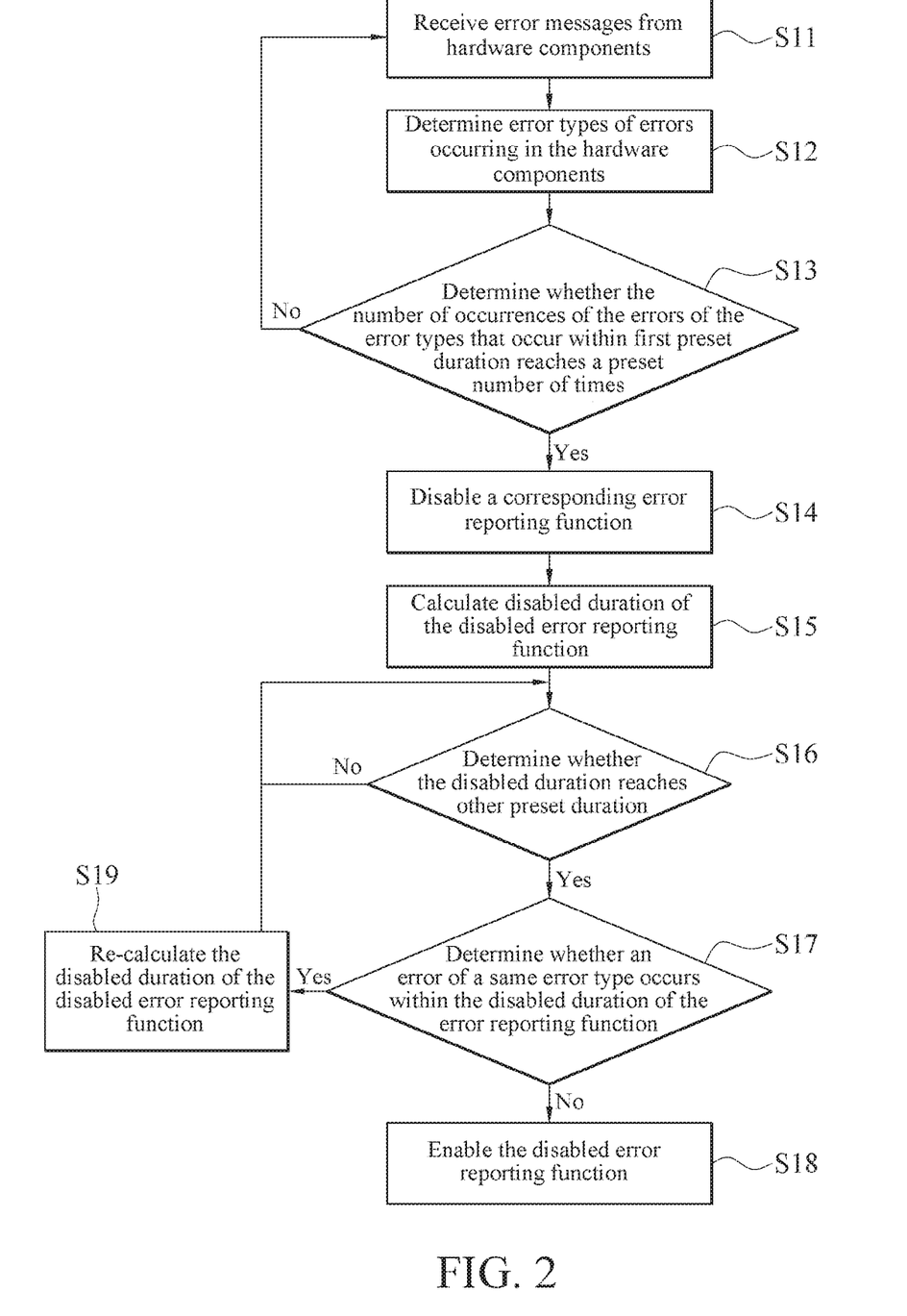
FIG. 2 is a flowchart of an embodiment of a method for controlling a correctable error reporting function according to the present invention.

FIG. 2 is a flowchart of an embodiment of a method for controlling a correctable error reporting function according to the present invention. Referring to FIG. 1 and FIG. 2 together, during operation, after the control unit 19 receives the error messages from the hardware components 11 to 18 (step S11), the control unit 19 determines, according to the foregoing plurality of predefined and preset error types, error types of the correctable errors occurring in the hardware components 11 to 18 (step S12). The control unit 19 may compare the preset error types with bits in the error messages for representing error types in step S12, to determine, the error types of the correctable errors occurring in the hardware components 11 to 18 by determining whether the error types represented by the bits match the preset error types. Subsequently, the control unit 19 determines, according to the types of the correctable errors occurring in the hardware components 11 to 18, whether the number of occurrences of the correctable errors of the error types that occur in the hardware components 11 to 18 within preset duration (hereinafter referred to as first preset duration) reaches a preset number of times (step S13).

For example, the first preset duration is one hour and the preset number of times is three. The control unit 19 determines whether the number of error messages corresponding to the first error type that are sent by all of the hardware components 11 to 18 within one hour reaches three, and then determines whether the number of error messages corresponding to the second error type that are sent by all of the hardware components 11 to 18 within one hour reaches three, and so on. The control unit 19 finally determines whether the number of error messages corresponding to the sixteenth error type that are sent by all of the hardware components 11 to 18 within one hour reaches three. When the control unit 19 performs step S13, when the control unit 19 determines that the number of error messages of an error type (for example, the first error type) that are sent by one hardware component (for example, the hardware component 11) within the first preset duration reaches three (that is, a determining result is "yes"), it indicates that the number of occurrences of correctable errors of the first error type that occur in the hardware component 11 within one hour reaches three. In this case, the control unit 19 disables an error reporting function of the hardware component 11 corresponding to the first error type (step S14). That is, the control unit 19 controls the hardware component 11 to stop performing the error reporting function corresponding to the first error type, so as to make the hardware component 11 does not send any error message corresponding to the first error type. In other words, after the error reporting function of the hardware component 11 is disabled, even an error of the first error type recurs, the control unit 19 will no longer receive any error message corresponding to the first error type from the hardware component 11, and the control unit 19 does not perform debug operation on the correctable errors of the first error type. Thereby, the heavy processing load to the control unit 19 caused by recording excessive error messages corresponding to the first error type or too frequently performing debug operations corresponding to the first error type could be avoided.

In an embodiment, in step S13, for example, the preset number of times is three. The control unit 19 may calculate, according to receiving time of the error messages, a time interval between the receiving time of a first error message and a third error message that are of a same error type, and determine whether the foregoing time interval is less than or equal to the first preset duration. For example, when errors of the fifth error type occur in the hardware component 11 at 10:22, 10:23, and 10:25 respectively, and the control unit 19 receives, at the foregoing time points, three error messages sent by the hardware component 11, the control unit 19 may obtain, through calculation, that a time interval between when the first correctable error of the fifth error type occurs in the hardware component 11 and when the third correctable error of the fifth error type occurs in the hardware component 11 is three minutes, which is less than the first preset duration being one hour. In addition, when errors of the tenth error type occur in the hardware component 17 at 10:31, 10:32, and 11:50 respectively, the control unit 19 can obtain, through calculation, that a time interval between when the first error of the tenth error type occurs in the hardware component 17 and when the third error of the tenth error type occurs in the hardware component 17 is 69 minutes, which is greater than the first preset duration being one hour.

Therefore, the control unit 19 does not disable error reporting functions of the hardware component 11 that correspond to the first error type to the fourth error type and error reporting functions of the hardware component 11 corresponding to the sixth error type to the sixteenth error type, and the control unit 19 does not disable error reporting functions of the other hardware components 12 to 17 that correspond to the first error type to the sixteenth error type. The control unit 19 disables only an error reporting function of the hardware component 11 and corresponding to the fifth error type. Subsequently, when an error of the fifth error type occurs in the hardware component 11, the hardware component 11 does not send any error message corresponding to the fifth error type. The hardware component 11 sends only an error message corresponding to another error type, for example, the third error type or the seventh error type, to the control unit 19.

In an embodiment, the control unit 19 may include a chipset 191 and a central processing unit 192. The chipset 191 is coupled to the hardware components 11 to 18 and the central processing unit 192. The chipset 191 is configured to: receive the error messages from the hardware components 11 to 18, and perform debug operations on the hardware components 11 to 18. In addition, when the chipset 191 determines that errors occur in the hardware components 11 to 18, the chipset 191 sends a system management interrupt (SMI) signal to the central processing unit 192, to enable a system management mode (SMM) of the central processing unit 192. The central processing unit 192 perform step S12 and step S13 in the SMM, to implement the foregoing detection mechanism.

Moreover, the hardware components 11 to 18 may be PCIe interface cards. The chipset 191 has a plurality of root ports. The plurality of root ports is coupled to the hardware components 11 to 18 on a one-to-one basis. The control unit 19 may scan all the root ports when receiving an error message, to detect one of the plurality of root ports that receives the error message, and therefore, determine one of the hardware components 11 to 18 that sends the error message, for example, the hardware component 11, to determine, in the hardware components 11 to 18, that the number of occurrences of correctable errors of the fifth error type that occur in the hardware component 11 within the first preset duration reaches the preset number of times. In addition, the control unit 19 further controls only the hardware component 11 not to send the error message corresponding to the fifth error type through a root port coupled to the hardware component 11.

Further, in some other embodiments, the hardware components 11 to 18 may alternatively be memory units. In other words, each of the hardware components 11 to 18 includes a plurality of memory channels, and each of the memory channels includes at least one dual in-line memory module (DIMM). Herein, after receiving the error messages from the hardware components 11 to 18, the control unit 19 may determine, by scanning each dual in-line memory module of each memory channel, a dual in-line memory module whose number of occurrences of correctable errors of a particular error type within the first preset duration reaches the preset number of times. In addition, the control unit 19 may independently control a dual in-line memory module of any one of the hardware components 11 to 18 to stop performing an error reporting function corresponding to a particular preset error type.

In an embodiment, for example, the control unit 19 disables the error reporting function of the hardware component 11 and corresponding to the fifth error type. After disabling the error reporting function of the hardware component 11 and corresponding to the fifth error type, the control unit 19 further calculates a disabled duration (hereinafter referred to as first disabled duration) of the disabled error reporting function corresponding to the fifth error type (step S15), and determines whether the first disabled duration of the error reporting function of the hardware component 11 and corresponding to the fifth error type reaches other preset duration (hereinafter referred to as second preset duration) (step S16). When the first disabled duration of the error reporting function of the hardware component 11 reaches the second preset duration (a determining result is "yes"), the control unit 19 determines whether the disabled error reporting function needs to be re-enabled, that is, determines whether the hardware component 11 needs to be controlled to perform the error reporting function corresponding to the fifth error type, and send an error message corresponding to the fifth error type when an error of the fifth error type occurs.

Specifically, the control unit 19 may determine whether the hardware component 11 needs to be controlled to re-send the error message corresponding to the fifth error type, by determining whether an error of a same error type, that is, an error of the fifth error type, recurs in the hardware component 11 within the first disabled duration of the error reporting function of the hardware component 11 (step S17). When a determining result obtained by the control unit 19 is "No" in step S17, it indicates that within the first disabled duration of the error reporting function corresponding to the fifth error type, a correctable error of the fifth error type does not recur in the hardware component 11. In this case, the control unit 19 re-enables the error reporting function of the hardware component 11 and corresponding to the fifth error type (step S18), so that the hardware component 11 can perform the error reporting function of the hardware component 11 at a subsequent time point when an error of the fifth error type occurs, and sends the error message corresponding to the fifth error type. On the other hand, when a determining result obtained by the control unit 19 is "yes" in step S17, it indicates that within the first disabled duration of the error reporting function corresponding to the fifth error type, the same error of the fifth error type recurs in the hardware component 11. To prevent the number of errors of the fifth error type that recur in the hardware component 11 within the first preset duration from reaching the preset number of times, the control unit 19 does not re-enable the error reporting function of the hardware component 11 and corresponding to the fifth error type. In this case, the control unit 19 may re-calculate another disabled duration (hereinafter referred to as second disabled duration) of the disabled error reporting function (step S19), and return to step S16, to re-determine whether the second disabled duration of the disabled error reporting function reaches the second preset duration, to determine whether the disabled error reporting function needs to be re-enabled.

In practice, the control unit 19 performs steps S11 to S19 when running an operating system. Moreover, in step S15, the control unit 19 may record the first and second disabled durations of the error reporting function of the hardware component 11 and corresponding to the fifth error type, calculate, in real time and according to the foregoing disabled duration, the first disabled duration and the second disabled duration of the error reporting function corresponding to the fifth error type, and determine accordingly whether the first disabled duration and the second disabled duration each reach the second preset duration in step S16. In an embodiment, the foregoing second preset duration may be three days.

Figure 3A:
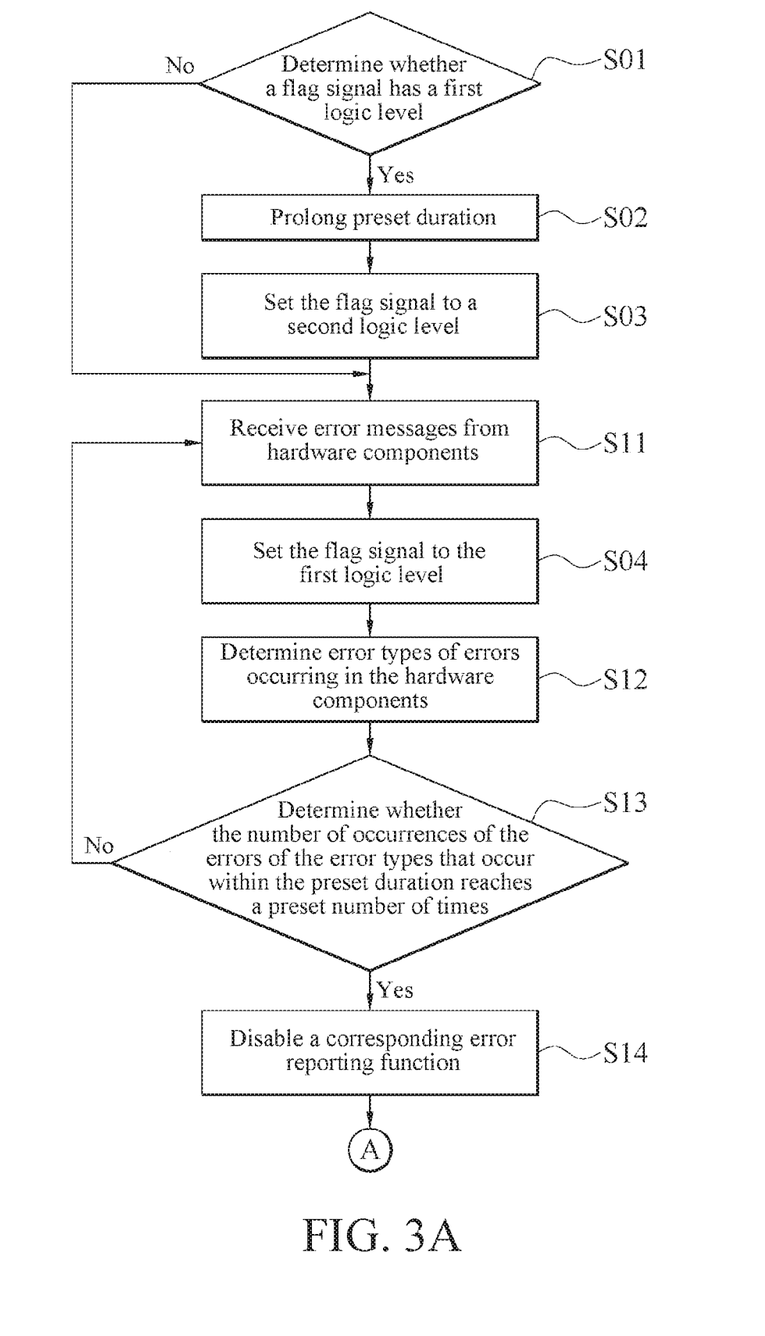
FIG. 3A is a flowchart of one part of another embodiment of a method for controlling a correctable error reporting function according to the present invention.
Figure 3B:
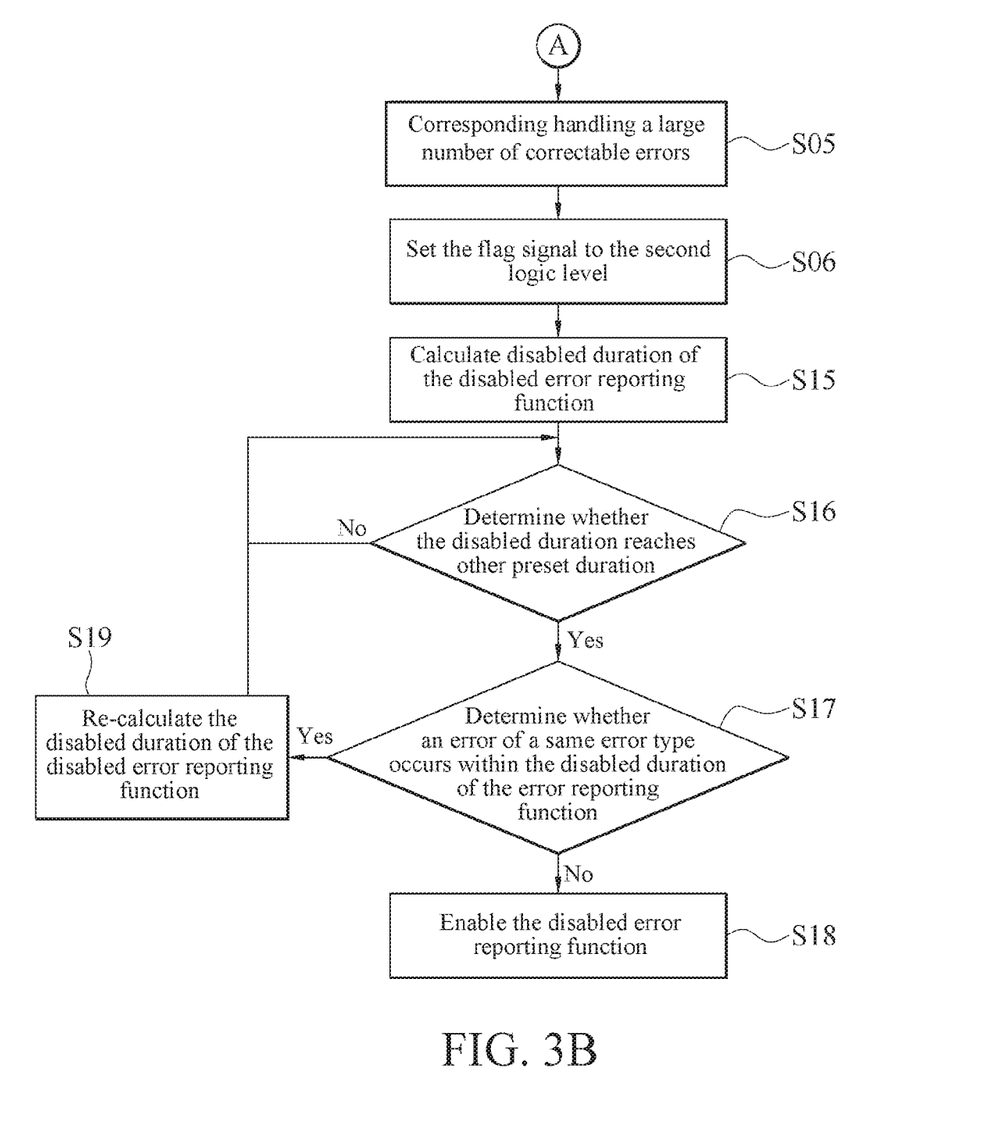
FIG. 3B is a flowchart of the other part following FIG. 3A.

FIG. 3A and FIG. 3B are a flowchart of another embodiment of a method for controlling a correctable error reporting function according to the present invention. Refer to FIG. 1, FIG. 3A and FIG. 3B together. In an embodiment, when the control unit 19 receives the error messages from the hardware components 11 to 18 (step S11), the control unit 19 may further set a flag signal stored in the non-volatile memory to a first logic level (step S04), to indicate that the correctable errors have occurred in the hardware components 11 to 18. Moreover, when the control unit 19 determines that the number of occurrences of the error types within the first preset duration reaches the preset number of times in step S13, the control unit 19 may further perform corresponding handling the large number of correctable errors that occur (step 505). For example, in step 505, the control unit 19 may record the error message sent by the hardware component 11 and corresponding to the fifth error type, and generate a log file including the error messages. The control unit 19 may perform debug operations according to the recorded error messages. Further, after handling the large number of correctable errors that occur, the control unit 19 may reset the foregoing flag signal to a second logic level (step S06). The second logic level is different from the first logic level, so that different logic levels of flag signals can be used to indicate whether the control unit 19 has correspondingly handled the large number of correctable errors that occur. In practice, the foregoing first logic level may be "1", and the second logic level may be "0".

Based on this, in step S05, for example, the control unit 19 performs debug operations within the first preset duration. The control unit 19 may perform debug operations on the errors of the fifth error type that occur in the hardware component 11 within the first preset duration being one hour. Each time the control unit 19 performs a power-on self-test (POST) procedure, the control unit 19 determines, according to the logic level of the flag signal, whether the debug operations have been performed on the large number of correctable errors that occur, so as to determine whether the first preset duration needs to be prolonged. As shown in FIG. 3A, the control unit 19 may determine, when performing the POST procedure, whether the flag signal stored in the non-volatile memory is the first logic level (step S01). When a determining result is "yes", it indicates that within operation duration (hereinafter referred to as a pervious operation duration) of the server device 10 before the current POST procedure is executed, a correctable error has occurred in any one of the hardware components 11 to 18 (for example, the foregoing hardware component 11). The control unit 19 has not performed, within the previous operation duration, any processing on the correctable error that has occurred, and therefore, does not set the flag signal to the second logic level. In the case that the server device 10 breaks down after the control unit 19 sets the flag signal to the first logic level (step S04). Consequently, there is not enough time for the control unit 19 to perform any processing on the error that has occurred (step S05), after setting the flag signal to the first logic level. For example, when correctable errors occur too many times in the hardware component 11 within the first preset duration, heavy processing load is caused to the control unit 19, which further causes the server device 10 to break down. In other words, when a POST procedure is executed, when the control unit 19 determines that the flag signal is the first logic level, it indicates that correctable errors may have occurred many times within the previous operation duration, and breakdown is caused. Therefore, there is not enough time for the control unit 19 to perform any processing on the errors that have occurred. As a result, the flag signal is the first logic level when POST is performed this time.

In a preferred embodiment, each time when the POST procedure is performed, when the control unit 19 determines that the flag signal is the first logic level, the control unit 19 prolongs the first preset duration in the POST procedure (step S02). For example, the control unit 19 may prolong the first preset duration to twice as long as the previous duration based on a preset multiple (for example, the preset multiple is twofold below), and set the flag signal to the second logic level in the POST procedure (step S03). Then, when subsequently running the operating system, the control unit 19 in step S13 determines whether the number of errors of an error type that occur in the hardware components 11 to 18 reaches the preset number of times according to the prolonged first preset duration. And the control unit 19 sets the flag signal to the first logic level again and again when the number of errors do not reaches the preset number of times within the prolonged first preset duration. Moreover, when the server device 10 breaks down again after the control unit 19 sets the flag signal to the first logic level according to the prolonged first preset duration in step S04, the control unit 19 performs the steps again from step S01 in another POST procedure, to prolong the first preset duration again according to the flag signal being the first logic level. Herein, after prolonging the first preset duration and when running the operating system, the control unit 19 has enough time to perform corresponding handling the large number of correctable errors occurring in the hardware components 11 to 18. When the server device 10 still breaks down after the control unit 19 prolongs the first preset duration, the control unit 19 can constantly prolong the first preset duration according to step S02 to buy more sufficient processing time until the server device 10 no long breaks down, thereby improving system stability of the server device.

On the other hand, when the control unit 19 determines, in the POST procedure, that the flag signal is the second logic level instead of the first logic level (that is, the determining result is "no"), the control unit 19 does not prolong the first preset duration. After the server device 10 completes the POST procedure of the server device 10, the control unit 19 then implements the detection mechanism of the control unit 19 according to the error messages from the hardware components 11 to 18. In an embodiment, the control unit 19 performs steps S04 to S06 when running the operating system.

In the case that the server device 10 breaks down because of correctable errors that occur too many times, and sequentially perform POST procedures at different time points (in the following descriptions, a POST procedure that is executed before the server device 10 breaks down is referred to as a first POST procedure, and a POST procedure that is executed after the server device 10 breaks down is referred to as a second POST procedure). After the server device 10 executes the first POST procedure, when the control unit 19 receives an error message from any one of the hardware components 11 to 18 when running the operating system, the control unit 19 sets a flag signal to a first logic level according to step S04, to indicate that a correctable error occurs in any one of the hardware components 11 to 18. Subsequently, when the server device 10 have not handled the correctable errors in step S05 and have not set the flag to the second logic level in step S06 and breaks down due to a large number of errors occur in the hardware components 11 to 18, the server device 10 executes the second POST procedure. In the second POST procedure, the control unit 19 performs step S01, and determines that the flag signal is the first logic level. This indicates that the control unit 19 does not handle the large number of correctable errors within the first preset duration when running the operating system after the first POST procedure. The control unit 19 then prolongs the first preset duration in the second POST procedure according to step S02, and reset the flag signal to the second logic level in the second POST procedure according to step S03.

In practice, the control unit 19 performs steps S01 to S06 and S12 to S19 by executing BIOS codes. Moreover, for example, the hardware components 11 to 18 are PCIe interface cards. The plurality of preset error types may be a receiver error status, a bad transaction layer packet (TLP) status, a bad data link layer packet (DLLP) status, a replay timer timeout status, an advisory non-fatal error status, a header log overflow status, and the like.

In conclusion, according to an embodiment of the method for controlling a correctable error reporting function for a server device in the present invention, a control unit can choose to disable an error reporting function of a corresponding hardware component according to a type of a correctable error occurring in the hardware component. The control unit does not need to disable all error reporting functions in order to prevent server breakdown caused by heavy processing load. Instead, the correctable error reporting function is partially disabled according to a type of a correctable error. In this way, a particular hardware component can be prevented from sending a large quantity of error messages of a particular error type, the effectiveness of a server device can be maintained, and an error reporting function corresponding to an error type can be retained, where the number of occurrence of errors of the error type does not reach a preset number of times, thereby maintaining system stability.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A method for controlling a correctable error reporting function and being applicable to a server device, comprises:
    receiving, by a control unit, a plurality of first error messages sent by a first hardware component in which a plurality of correctable errors occur in a plurality of hardware components;
    determining, by the control unit, according to the first error messages, error types of the errors occurring in the first hardware component;
    determining, by the control unit, whether the number of occurrences of the errors of the error types that occur in the first hardware component within a first preset duration reaches a preset number of times;
    when the control unit determines that the number of occurrences of the errors of a first error type that occur in the first hardware component within the first preset duration reaches the preset number of times, controlling, by the control unit, the first hardware component to stop performing an error reporting function corresponding to the first error type after the first hardware component sends the first error messages; and
    after a first power-on self-test (POST) procedure being executed by the server device, when the control unit runs an operating system and determines that the number of occurrences of the errors of the first error type that occur in the first hardware component within the first preset duration reaches the preset number of times, prolonging, by the control unit, the first preset duration when the server device executes a second POST procedure.

2. The method for controlling a correctable error reporting function and applicable to a server device according to claim 1 wherein
    the hardware components are PCIe interface cards, and
    the control unit determines the number of occurrences of the errors of the first error type that occur in the first hardware component within the first preset duration reaches the preset number of times in the hardware components by scanning a plurality of root ports coupled to the hardware components.

3. The method for controlling a correctable error reporting function and applicable to a server device according to claim 2, wherein the control unit controls the first hardware component to stop performing the error reporting function corresponding to the first error type, in the hardware components through the root ports coupled to the hardware components.

4. The method for controlling a correctable error reporting function and applicable to a server device according to claim 1, wherein
    the hardware components are memory units,
    each of the hardware components comprises a plurality of memory channels,
    each of the memory channels is provided with at least one dual in-line memory module, and
    the control unit further scans each of the dual in-line memory modules of each of the memory channels, to determine, in the first hardware component, a dual in-line memory module whose number of occurrences of errors of the first error type within the first preset duration reaches the preset number of times.

5. The method for controlling a correctable error reporting function and applicable to a server device according to claim 4, wherein the control unit further controls a dual in-line memory module comprised in the first hardware component to stop performing the error reporting function corresponding to the first error type.

6. The method for controlling a correctable error reporting function and applicable to a server device according to claim 1, wherein in the step of determining, by the control unit, whether the number of occurrences of the errors of the error types that occur in the first hardware component within the first preset duration reaches the preset number of times, the control unit performs, within the first preset duration, debug operation on the errors occurring in the first hardware component.

7. The method for controlling a correctable error reporting function and applicable to a server device according to claim 1, wherein in the step of prolonging, by the control unit, the first preset duration, the control unit prolongs the first preset duration in the second POST procedure based on a preset multiple.

8. The method for controlling a correctable error reporting function and applicable to a server device according to claim 7, wherein the preset multiple is twofold.

9. The method for controlling a correctable error reporting function and applicable to a server device according to claim 1, wherein the preset number of times is three times.

10. The method for controlling a correctable error reporting function and applicable to a server device according to claim 1, wherein the first preset duration is one hour.

11. A method for controlling a correctable error reporting function and being applicable to a server device, comprising:
    receiving, by a control unit, a plurality of first error messages sent by a first hardware component in which a plurality of correctable errors occur in a plurality of hardware components;
    determining, by the control unit, according to the first error messages, error types of the errors occurring in the first hardware component;
    determining, by the control unit, whether the number of occurrences of the errors of the error types that occur in the first hardware component within a first preset duration reaches a preset number of times; and
    when the control unit determines that the number of occurrences of the errors of a first error type that occur in the first hardware component within the first preset duration reaches the preset number of times, controlling, by the control unit, the first hardware component to stop performing an error reporting function corresponding to the first error type after the first hardware component sends the first error messages, wherein after the step of controlling, by the control unit, the first hardware component to stop performing an error reporting function corresponding to the first error type, the method further comprises:

calculating, by the control unit, a first disabled duration that the first hardware component stops performing the error reporting function corresponding to the first error type;

determining, by the control unit, whether the first disabled duration reaches a second preset duration; and when the first disabled duration reaches the second preset duration, determining, by the control unit, whether the first hardware component needs to be controlled to re-enable the error reporting function corresponding to the first error type.

12. The method for controlling a correctable error reporting function and applicable to a server device according to claim 11, wherein the step of determining, by the control unit, whether the first hardware component needs to be controlled to re-enable the error reporting function corresponding to the first error type comprises:

determining, by the control unit, whether another error corresponding to the first error type occurs in the first hardware component within the first disabled duration of the error reporting function.

13. The method for controlling a correctable error reporting function and applicable to a server device according to claim 12, wherein, when the control unit determines that another error corresponding to the first error type does not occur within the first disabled duration, the control unit controls the first hardware component to re-enable the error reporting function corresponding to the first error type.

14. The method for controlling a correctable error reporting function and applicable to a server device according to claim 12, further comprising:

when the control unit determines that another error corresponding to the first error type occurs in the first hardware component within the first disabled duration of the error reporting function, recalculating, by the control unit, a second disabled duration for which the error reporting function is disabled once the first disabled duration reaches the second preset duration; and determining, by the control unit, whether the second disabled duration reaches the second preset duration, to determine whether the first hardware component needs to be controlled to re-enable the error reporting function corresponding to the first error type.

15. A method for controlling a correctable error reporting function and being applicable to a server device, comprising:

receiving, by a control unit, a plurality of first error messages sent by a first hardware component in which a plurality of correctable errors occur in a plurality of hardware components;

determining, by the control unit, according to the first error messages, error types of the errors occurring in the first hardware component;

determining, by the control unit, whether the number of occurrences of the errors of the error types that occur in the first hardware component within a first preset duration reaches a preset number of times; and when the control unit determines that the number of occurrences of the errors of a first error type that occur in the first hardware component within the first preset duration reaches the preset number of times, controlling, by the control unit, the first hardware component to stop performing an error reporting function corresponding to the first error type after the first hardware component sends the first error messages, wherein the control unit receives the first error messages from the first hardware component when running an operating system between a first POST procedure and a second POST procedure executed sequentially by the control unit at different time points, and the control unit determines, when running the operating system between the first POST procedure and the second POST procedure, whether the number of occurrences of the errors of the error types that occur in the first hardware component within the first preset duration reaches the preset number of times.

16. The method for controlling a correctable error reporting function and applicable to a server device according to claim 15, further comprising:

when the errors occur in the first hardware component, setting, by the control unit, a flag signal to a first logic level according to the first error messages when running the operating system; and when the control unit determines, when running the operating system, that the number of occurrences of the errors occurring in the first hardware component within the first preset duration reaches the preset number of times, corresponding handling the correctable errors by the control unit when running the operating system, and resetting the flag signal to a second logic level other than the first logic level after the correctable errors are handled by the control unit.

17. The method for controlling a correctable error reporting function and applicable to a server device according to claim 16, further comprising:

determining, by the control unit when the second POST procedure is executed, whether the flag signal is the first logic level, to determine whether the correctable errors have been handled correspondingly when running the operating system; and when the control unit determines, in the second POST procedure, that the flag signal is the first logic level, prolonging, by the control unit, the first preset duration based on a preset multiple in the second POST procedure, and resetting the flag signal to the second logic level.

18. The method for controlling a correctable error reporting function and applicable to a server device according to claim 17, wherein the flag signal is stored in a non-volatile memory.

* * * * *